W. W. BEAN.
Wagon-Brake.
No. 63,833.          Patented Apr. 16, 1867.
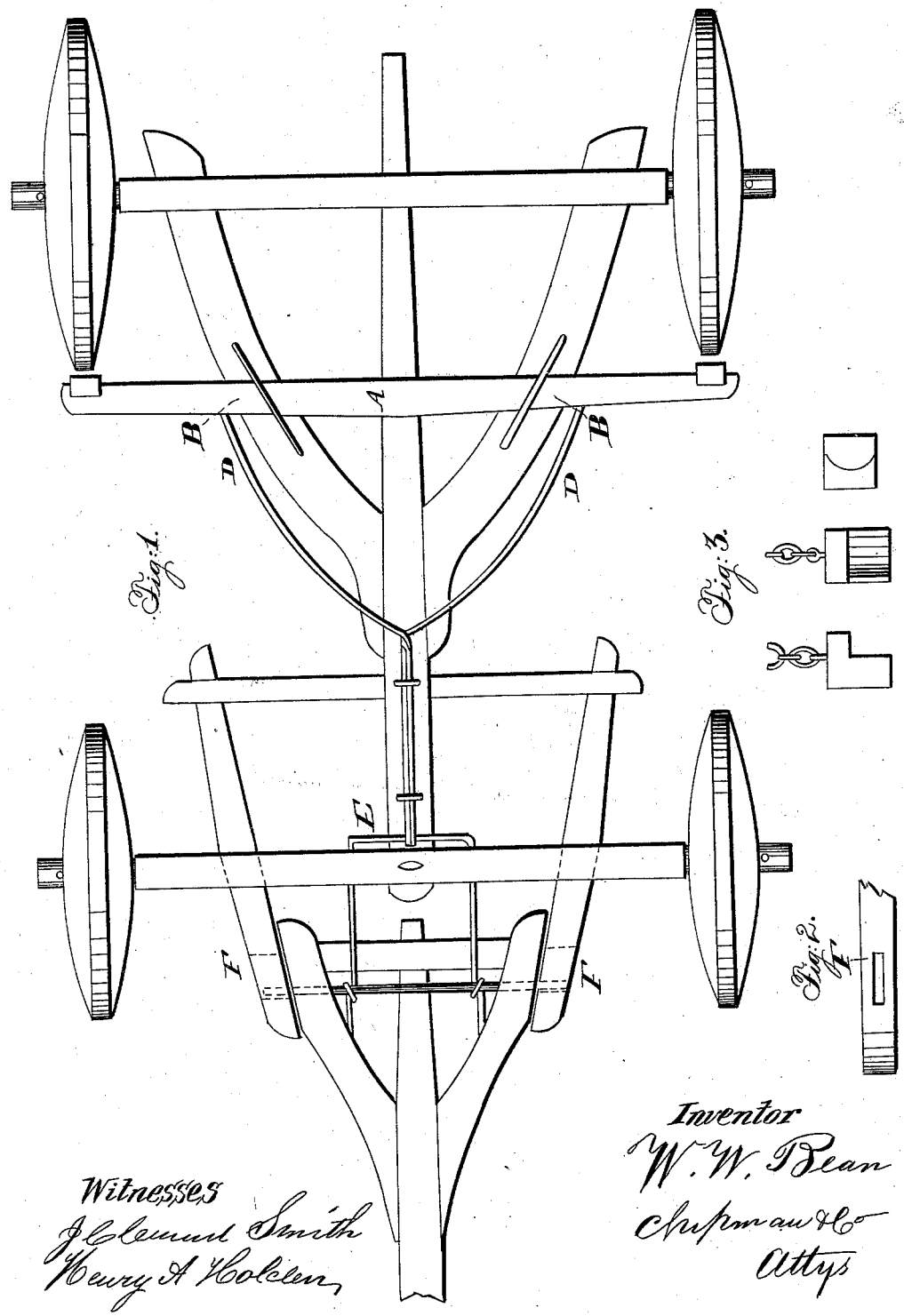

United States Patent Office.

W. W. BEAN, OF IOWAVILLE, IOWA.

Letters Patent No. 63,833, dated April 16, 1866.

IMPROVEMENT IN WAGON-BRAKES.

The Schedule referred to in these Letters Patent and making part of the same.

TO ALL WHOM IT MAY CONCERN:

Be it known that I, W. W. BEAN, of Iowaville, in the county of Van Buren, in the State of Iowa, have invented a new and useful Improvement in Wagon-Brakes; and I do hereby declare that the following is a full, clear, and exact description of the construction and operation of the same, reference being had to the annexed drawings, making a part of this specification, in which—

Figure 1 represents a perspective view of the brake attached to the wagon.

Figure 2, a section of the tongue hounds with oblong hole cut in.

Figure 3 represents the several views of a key-block to be inserted in the space between the end of the coupling and the projection of the tongue through the cross-brace.

A represents the body of the wooden rubber confined loosely but securely by means of the staples B B', in which it slides. D D' represent iron bars clasping the bar E and retained in their place upon the coupling by staples. E represents the bar bent, as shown in the drawing, and extends through the space between the sand-board and the axle, lapping the tongue-bar. F represents an oblong hole made in the tongue hounds, in which the ends of the tongue-bar slide. C represents a key-block, fig. 3, to be inserted in the space between the tongue's end and the end of the coupling.

The object of the improvement is to afford a wagon-brake operating by the action of the tongue sliding in the oblong holes in the tongue hounds, and which may be arrested in its action by the insertion of the key-block between the ends of the tongue and the end of the coupling.

What I claim as my improvement, and desire to secure by Letters Patent, is—

The application of the key-block C, fig. 3, in combination with brake operating upon the wheels by the action of tongue-bar sliding in the holes made (F) in the tongue hounds, with the frame E and brace-bars D D connected with the wooden rubber, as substantially described.

W. W. BEAN.

Witnesses:
J. D. BAKER,
A. G. HEYLMAN.